(12) United States Patent
Di Maggio et al.

(10) Patent No.: US 8,036,706 B2
(45) Date of Patent: Oct. 11, 2011

(54) METHOD FOR ACCESSING AN ADDITIONAL SERVICE PROVIDED BY AN IC CARD TOOLKIT APPLET

(75) Inventors: Luigi Di Maggio, Casapulla (IT); Corrado Guidobaldi, Naples (IT)

(73) Assignee: Incard SA, Geneva (CH)

( * ) Notice: Subject to any disclaimer, the term of this patent is extended or adjusted under 35 U.S.C. 154(b) by 1075 days.

(21) Appl. No.: 11/848,671

(22) Filed: Aug. 31, 2007

(65) Prior Publication Data
US 2008/0058016 A1 Mar. 6, 2008

(30) Foreign Application Priority Data
Aug. 31, 2006 (EP) .................................... 06018179

(51) Int. Cl.
*H04M 1/00* (2006.01)
(52) U.S. Cl. ..................... 455/558; 455/550.1; 455/418; 455/333
(58) Field of Classification Search .................. 455/558, 455/550.1, 418, 333
See application file for complete search history.

(56) References Cited

U.S. PATENT DOCUMENTS

| 5,848,140 A | 12/1998 | Foladare et al. | ............... 379/201 |
| 6,175,741 B1 * | 1/2001 | Alperovich | ................... 455/458 |
| 6,745,022 B2 * | 6/2004 | Knox | ........................... 455/406 |

FOREIGN PATENT DOCUMENTS

| EP | 1569477 | 8/2005 |
| WO | WO01/24494 | 4/2001 |

* cited by examiner

*Primary Examiner* — Danh Le
(74) *Attorney, Agent, or Firm* — Lisa K. Jorgenson; Allen, Dyer, Doppelt, Milbrath & Gilchrist, P.A.

(57) ABSTRACT

A method is for selecting at least one additional service in a mobile telephone or mobile equipment having a keyboard for dialing a number to set up a telephone communication. The at least one additional service may be provided by an Integrated Circuit (IC) Card in the mobile equipment. The method may include comparing a dialed number with at least one service number stored in the IC Card and associated to the at least one additional service, terminating the set up of the telephone communication, and triggering the associated additional service corresponding to the dialed number.

21 Claims, 4 Drawing Sheets

METHOD FOR ACCESSING AN ADDITIONAL SERVICE PROVIDED BY AN IC CARD TOOLKIT APPLET

FIELD OF THE INVENTION

The present invention relates to a method for selecting additional services in mobile telephone equipment, more particularly, selecting additional services being provided by an Integrated Circuit (IC) Card hosted in the mobile telephone equipment.

BACKGROUND OF THE INVENTION

A known mobile equipment or mobile telephone generally includes a display and a keyboard intended to support interaction with a user. With reference to FIG. 1, an example known mobile telephone is schematically depicted with a display showing a menu. The menu comprises a plurality of entries (Entry 1, Entry 2 ... Entry n) being displayed. When a user selects an entry from the menu, a corresponding service is executed.

Based upon the choice of the mobile telephone manufacturer, the mobile telephone provides the service and the menu with the corresponding entry. For example, taking into consideration first and second mobile telephones, a service of writing an Short Message Service (SMS) is reached according to a different selection of entries on corresponding menus on the first and the second mobile telephones. Additional to the services provided by the mobile telephone, one or more additional services may be supported by an IC Card hosted inside the mobile telephone.

More particularly, a Subscriber Identity Module (SIM) toolkit applet is a specific application intended to be stored and executed on an IC Card in order to provide an additional service. The additional service is initialized by the mobile telephone hosting the IC Card, for example, through its keyboard. More particularly, one or more entries inside the menu of the mobile telephone, for example, the entry "Entry N" (FIG. 1), provide access to the additional services.

Generally, such additional services are recalled by a submenu comprising a plurality of application entries (App. Entry 1, App. Entry 2 ... App. Entry n) so that the one or more entries inside the menu of the mobile telephone provide access to the submenu, and the submenu manages the access to the additional services through the application entries.

In FIG. 1, the recall of the submenu is executed by a selection of the entry "Entry n" of the menu of the mobile telephone. In this way, a plurality of additional services, being provided by corresponding SIM toolkit applets, are called by an application entry inside the submenu after browsing the menu of the mobile telephone to reach the entry corresponding to the submenu recall. Currently, there is no standard relative location inside the menu for an entry dedicated to recalling the submenu of the additional entries. Accordingly, an additional service furnished by the SIM Toolkit applet is reached according to a different sequence of menu choices on the mobile telephone, depending on the model of the mobile telephone that hosts the IC Card.

When such a sequence of menu choices on the mobile telephone keyboard is not user-friendly, for example, because the entry for accessing the submenu is severely nested, the access to the additional service is unpractical for the user. To address such a limitation, some telecom operators provide a hardware approach based on a special button on the mobile telephone keyboard in order to directly access the submenu. The hardware approach depends on the mobile telephone manufacturer and is not portable.

Due to the prior art drawbacks, there is need for a method for selecting one or more additional services provided by an IC Card to a mobile telephone that hosts the IC Card while avoiding the selection of a specific sequence of menu choices in the mobile telephone. Moreover, at the same time, there is need for a method that may provide direct and immediate access to the additional services independent of the hardware of the mobile telephone and may provide an approach to the limitations currently bounding the recall of additional services provided by IC Cards.

SUMMARY OF THE INVENTION

The approach provides a method for associating a telephone call, based on a fictitious telephone number, for example, comprising numeric digits or short telephone numbers, to recall an additional service being provided by an IC Card. The method may include interrupting a real telephone call and recalling the additional service when it detects a relation between the composed fictitious phone number and the additional service.

An approach to the above noted drawbacks is provided by a method for accessing a service provided by a SIM toolkit applet as previously indicated. The method is also for selecting at least one additional service in a mobile telephone or mobile equipment having a keyboard for dialing a number to set up a telephone communication. The at least one additional service may be provided by an IC Card in the mobile telephone. The method may include comparing a dialed number with at least one service number stored in the IC Card and associated to the at least one additional service, terminating the set up of the telephone communication, and triggering the associated additional service corresponding to the dialed number.

BRIEF DESCRIPTION OF THE DRAWINGS

Further characteristics and the advantages of the method according to the present invention may be apparent from the following description of an embodiment thereof, made with reference to the annexed drawings, given for indicative and non-limiting purpose.

DETAILED DESCRIPTION OF THE PREFERRED EMBODIMENTS

Figure 2:
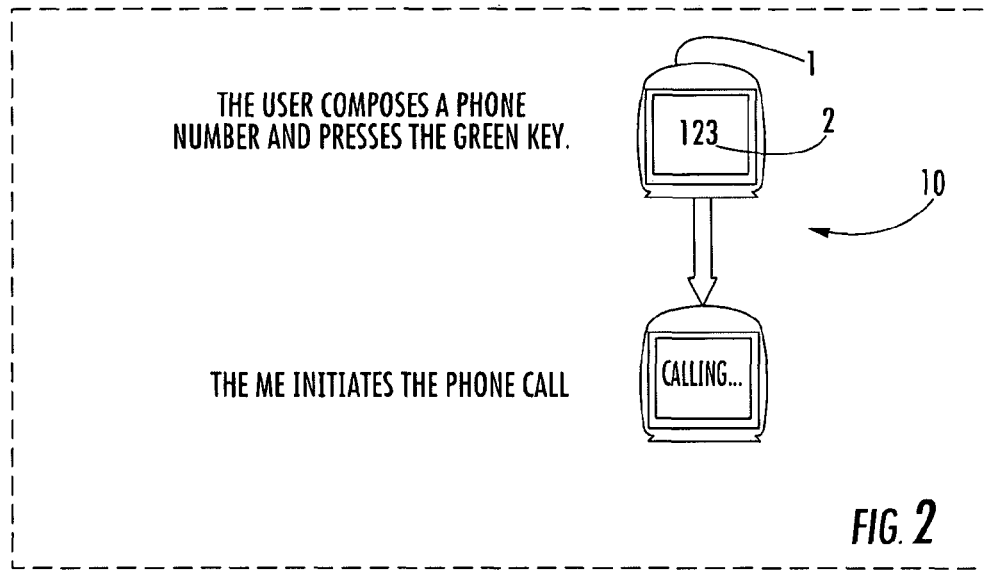
FIG. 2 schematically shows the method for accessing an additional service provided by a SIM toolkit applet during a composition of a telephone phone call, according to the present invention.

According to the present invention and with reference to the annexed drawings, a method for accessing an additional service provided by a SIM toolkit applet is schematically indicated with numeral reference 10. More particularly, with reference to FIG. 2, a mobile telephone 1 comprises a mobile telephone keyboard 2 allowing a user to interact with the mobile telephone 1 itself. For example, a user may compose a telephone number for a corresponding telephone call or browse a menu displayed on a display of the mobile telephone, providing access to services, such as, setting a timer, writing a SMS message, and similar. Moreover, the mobile telephone 1 hosts an IC Card 3, storing a plurality of data and one or more applications.

When the user intends to communicate through a telephone call, the user composes a telephone number through the keyboard 2 and presses a specific button on the keyboard 2 in order to set up the communication with a destination telephone device, corresponding to the dialed telephone number. According to the method, when the user presses the specific button on the keyboard 2 of the mobile telephone 1, the dialed telephone number is compared with one or more service numbers, stored inside a memory unit of the IC Card 3. More particularly, if the dialed telephone number matches one of the stored service numbers, the telephone call is interrupted.

Figure 3:
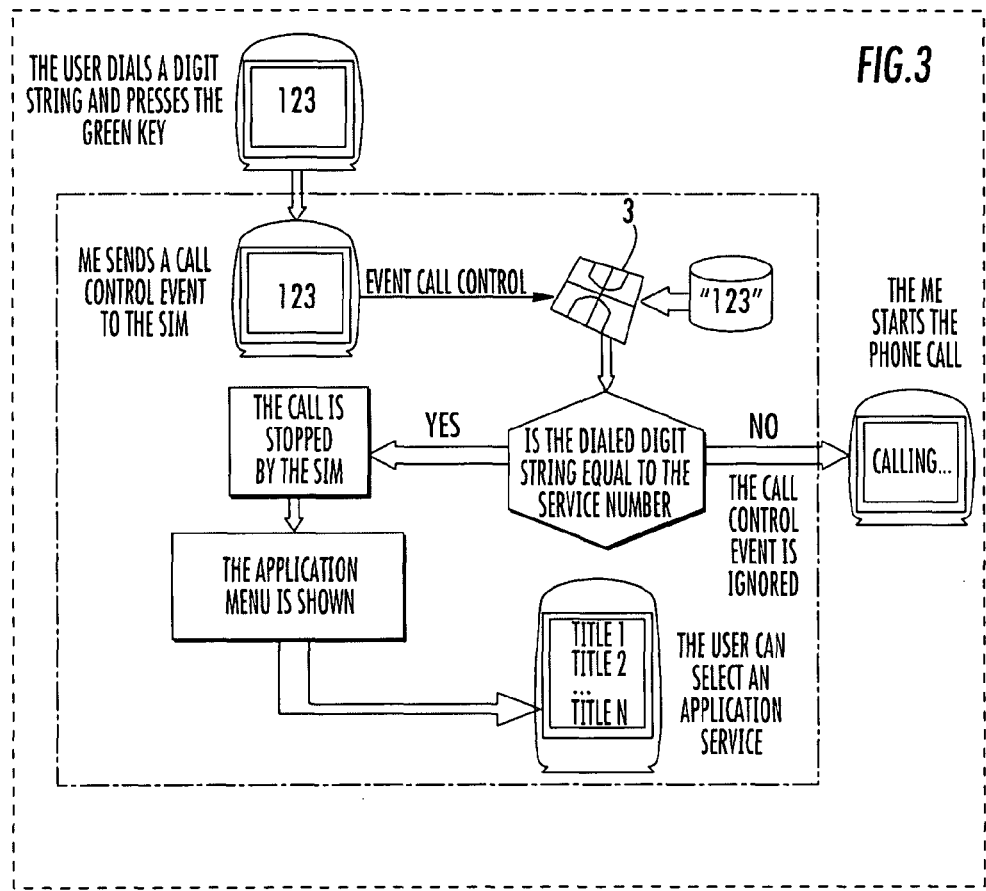
FIG. 3 schematically shows, in a sequence of steps, the method for accessing an additional service provided by a SIM toolkit applet, according to the present invention.
Figure 4:
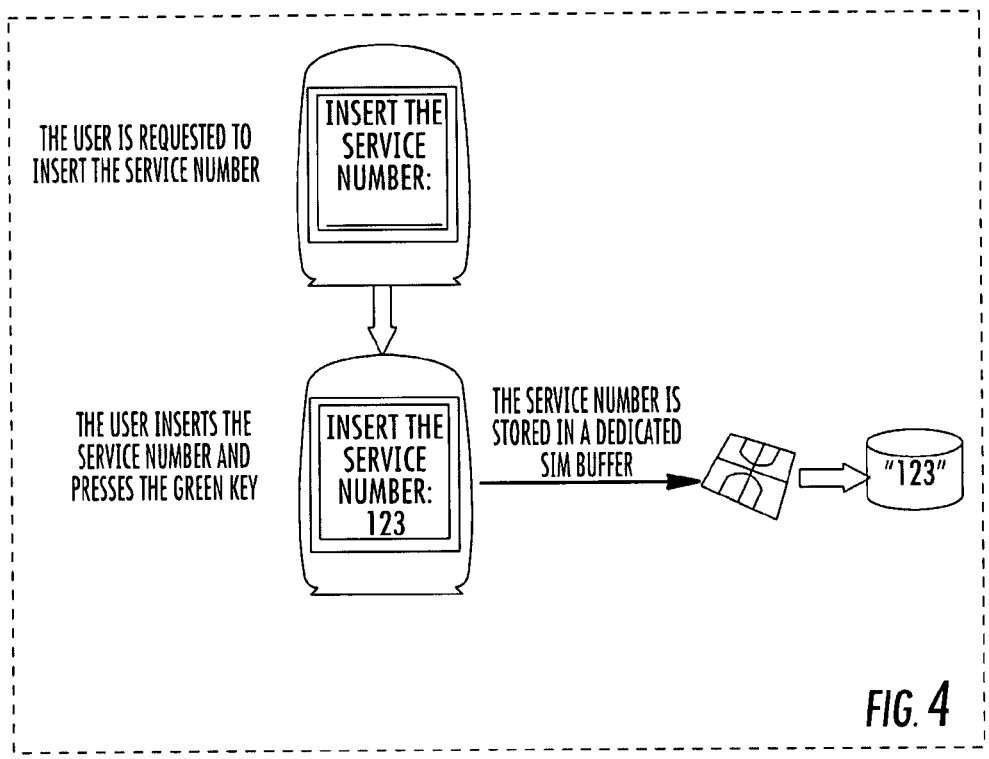
FIG. 4 schematically shows an association of a fictitious telephone number to an additional service provided by a SIM toolkit applet, according to an initialization phase of the method of the present invention.

According to the method of the present invention, the service numbers are recognized as fictitious telephone numbers, not intended to be mapped to a corresponding destination telephone number. When the service number is dialed, an application menu is displayed on the display of the mobile telephone 1, as schematically represented in FIG. 3. More particularly, in such a figure, the user composes a service number "123" and types a specific button on the keyboard 2, for example, a green button generally intended to initiate a conversation. The mobile telephone 1, receiving a query for a telephone call, sends a Call Control event to the IC Card 3 to manage the telephone communication with a telephone destination device.

The operations performed by the mobile telephone 1 are standard, since the Call Control event is a standard event generated and sent to the IC Card by the mobile telephone 1 when the user dials a telephone call. When the IC Card 3 receives the Call Control event, it compares the telephone number embedded in the Call Control event to the services numbers stored inside the memory unit of the IC Card 3. According to the method, an initialization phase, specified in more detail in the following description, provides the storing of the service numbers. If the telephone number associated to the Call Control event is not equal to one of the service numbers stored inside the IC Card 3, a telephone communication with a destination telephone device corresponding to the dialed telephone number is set up, in a conventional way. Otherwise, if the telephone number associated to the Call Control event is equal to one of the service numbers stored inside the IC Card 3, the telephone call is stopped by the IC Card 3 and a submenu is shown on the mobile telephone 1 display.

More particularly, the submenu comprises one or more application entries, App. Entry 1, App. Entry 2, associated for recalling corresponding SIM toolkit applets. Through standard keys on the mobile telephone keyboard 2, a user may select an application entry and start the corresponding additional service. Each time a telephone call is dialed and activated by a user, this method provides a comparing of the dialed telephone number to the stored service numbers, allowing a telephone call or denying it to display the submenu.

Without limiting the scope of the method, another embodiment of the method is hereinafter described with reference to a pair of applications stored inside a memory unit of the IC Card 3. More particularly, a first application, hereinafter indicated as the master applet, is registered to the Call Control event so that it is triggered whenever a Call Control event takes place.

The master applet is in charge of matching a dialed telephone number with the service numbers corresponding to additional services, terminating the telephone call originated by the mobile telephone when the telephone number corresponds to one of the service numbers and displaying a submenu, and triggering a SIM toolkit applet corresponding to an application entry selected by a user in the submenu. Moreover, the master applet is charged to perform the initialization phase in which the user associates one or more service numbers to one or more additional services.

The initialization phase is not mandatory, since the service number may be associated to an additional service, for example, directly by an IC card manufacturer. In this way, the dialing of a telephone number corresponding to a service number determines the direct activation of the corresponding additional services, bypassing the displaying of the submenu. The initialization phase increases the user personalization capability since more than one service number may be mapped to more than one additional service. Moreover, the user may choose a personal and mnemonic service number for a preferred additional service.

A SIM toolkit applet or menu applet is stored inside the IC Card 3 and charged to implement a corresponding additional service. More particularly, each menu applet is identified by an identification number AID known to the master applet. All the AIDs are, for example, stored in a file inside the IC Card 3, namely elementary file applet identification $EF_{AID}$ intended to be read by the master applet. One or more menu applets may share the processToolkit procedure, which is a mandatory main entry point of a SIM toolkit applet.

An interaction between the master applet and the menu applets according to the method is based on a Shareable Interface: each time a Call Control event occurs, if the dialed telephone number matches with a stored service number, the master applet terminates the telephone call and issues a Select_Item proactive command showing the submenu. Each item of the Select_Item comprises a title for the menu applet, being understandable by the user. Each menu applet implements an additional service. When the user of the mobile telephone selects a menu applet through its title, the relevant processToolkit procedure is executed.

Figure 7:
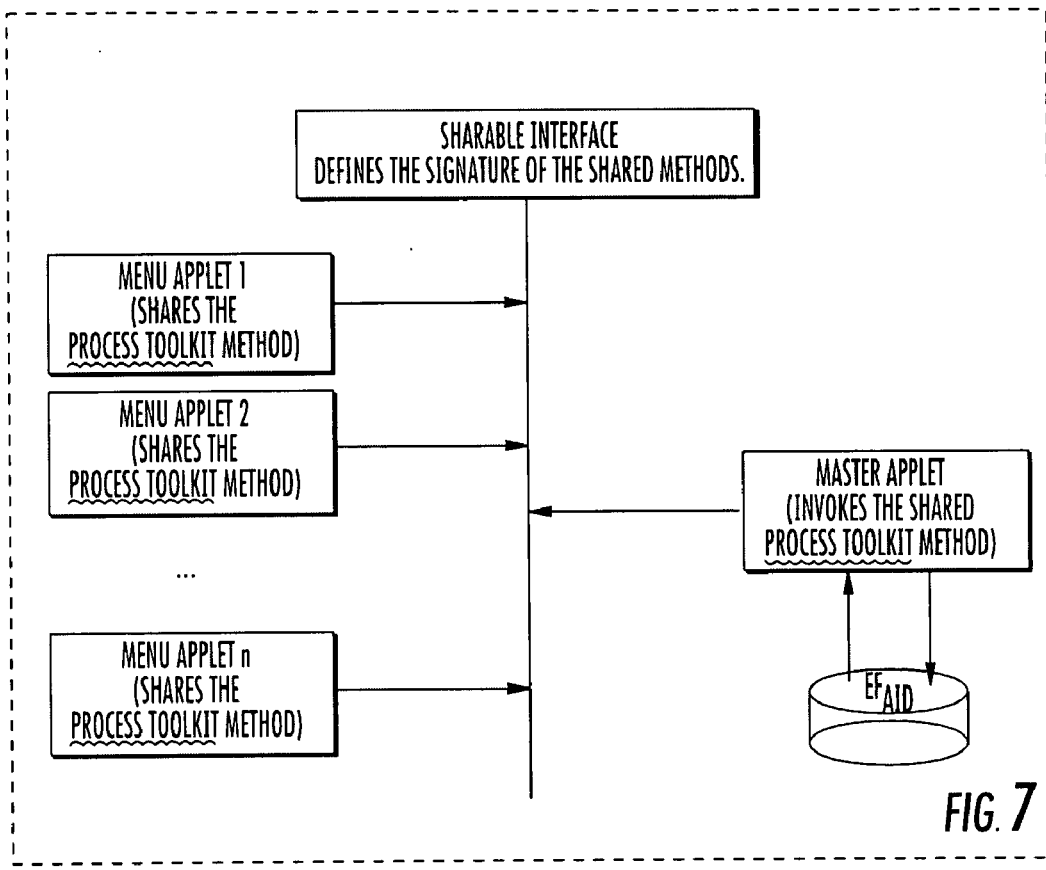
FIG. 7 schematically shows in a block diagram an interaction among a master applet and a set of menu applets, according to the present invention.

More particularly, with reference to FIG. 7, the master applet reads the menu applet AID in the $EF_{AID}$ and uses the AID to trigger the requested menu applet, calling its processToolkit procedure through the shareable interface. The master applet is triggered when a telephone number is dialed and the green key is pressed. For example, with reference to the drawings, the telephone number composed by the user is "123" and it corresponds to a service number.

Figure 5:
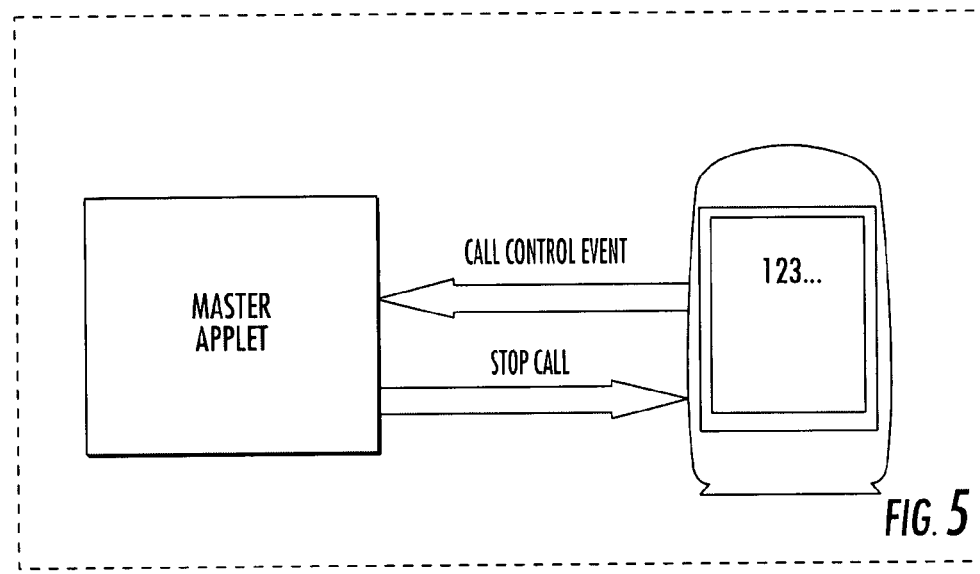
FIG. 5 schematically shows the stopping of a telephone call based on a fictitious telephone number, according to the present invention.
Figure 6:
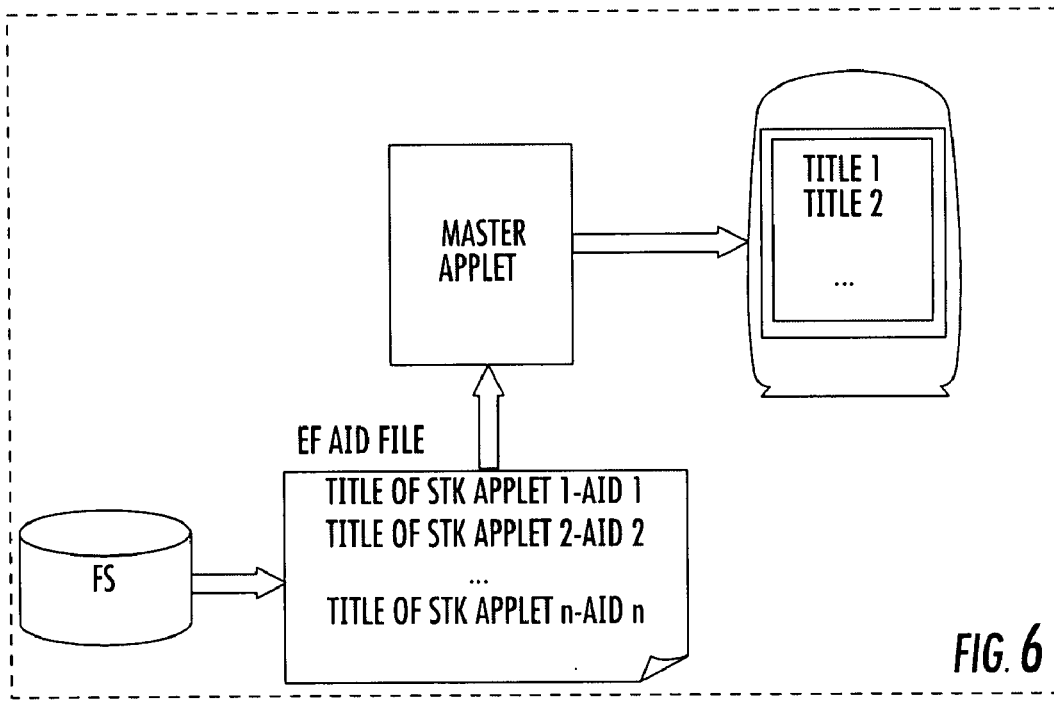
FIG. 6 schematically shows a selection of an additional service in an application menu, according to the present invention.

After the selection of the specific green key, a telephone call to the "123" telephone number is attempted. The master applet is then triggered on the Call Control event generated by the mobile telephone 1. As schematically shown in FIG. 5, the master applet terminates the telephone call and it issues a Select_Item in which each item indicates a menu applet. FIG. 6 schematically shows a list of titles associated to SIM toolkit applets, stored inside a file system FS.

The Shareable Interface comprises a signature of the Applet.processToolkit( ) procedure. Since the procedure is mandatory in each SIM toolkit applet, no additional effort is requested for the implementation of the menu applets. For completeness sake, it should be noted that the Applet.process-Toolkit( ) procedure is an entry point for each toolkit applet. This is the procedure that receives the Events, generated by the mobile telephone, to which the application is registered. If a toolkit applet is registered to the EVENT_MENU_SELECTION and if the user chooses the application entry corresponding to the toolkit applet in the submenu (FIG. 1), an EVENT_MENU_SELECTION is generated by the mobile telephone and sent to the the registered application.

Figure 1:
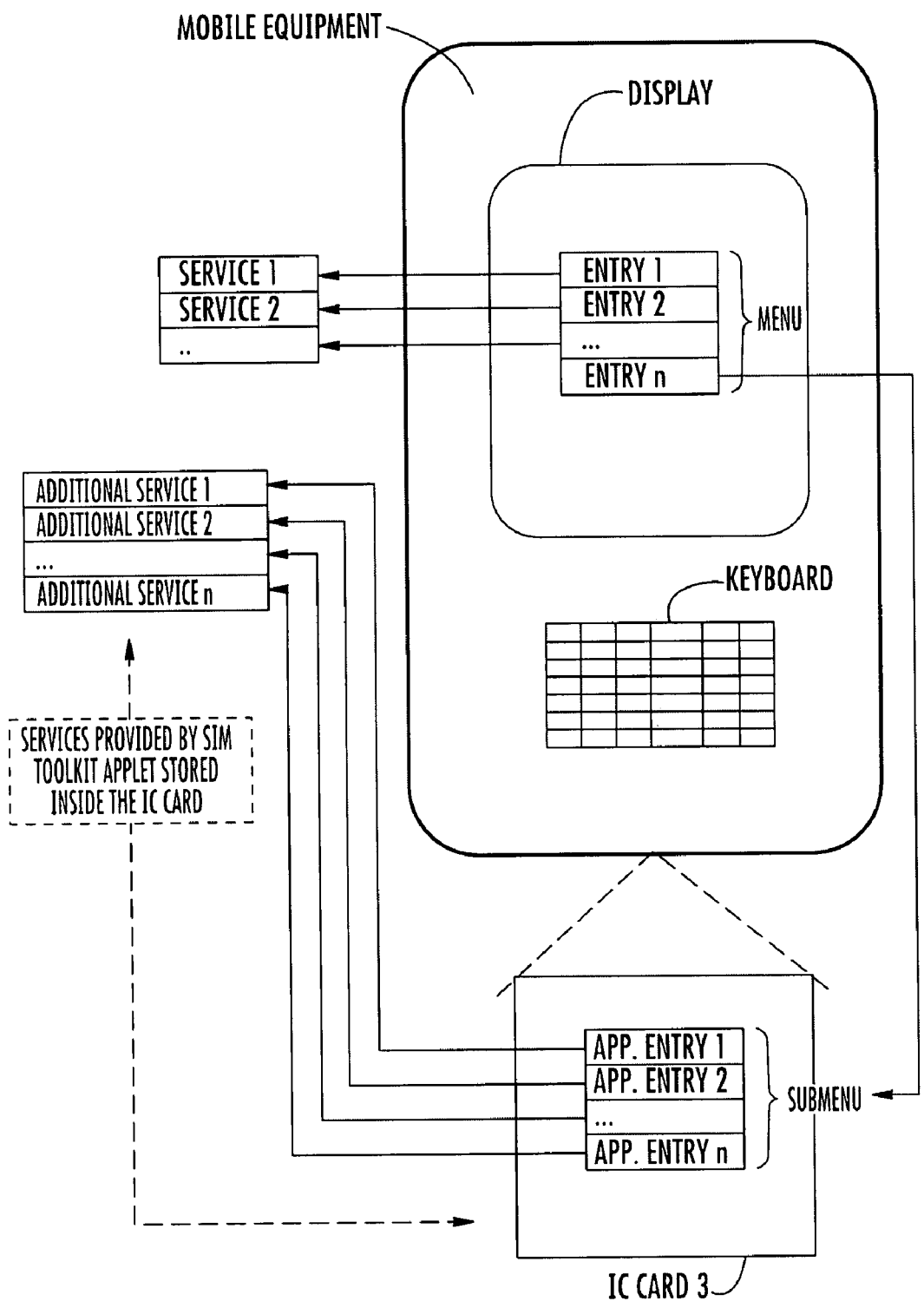
FIG. 1 schematically shows the recalling of a submenu comprising application entries through an entry inside the menu of the mobile telephone, according to the prior art.

According to the method, the master applet is registered to the CALL_CONTROL_EVENT. As soon as a telephone call is attempted, a CALL_CONTROL_EVENT is generated by the mobile telephone and sent to the IC Card. The master applet is then triggered and if the telephone number embedded in the event corresponds to a service number, the call is stopped and the submenu of FIG. 1 is shown. After the selection of an item in the submenu, the master applet gets a reference of a Shareable Interface Object (SIO) by invoking the JCSystem.getAppletShareableInterfaceObject(AID aid) procedure, being "aid" the application identifier of the selected menu applet. The master applet invokes the SIO.processToolkit(byte event) procedure, where "event" is the EVENT_MENU_SELECTION constant. The execution of the selected menu applet takes place exactly as if it is recalled by a conventional menu of the mobile telephone.

Advantageously, when a new menu applet may be added, the method provides the new menu applet implementing the Shareable Interface and it inserts the AID associated to the new menu applet inside the $EF_{AID}$ file. On the contrary, when a menu applet may be disabled, the AID of such a menu applet may be removed by the $EF_{AID}$ file. The recall of the submenu and the execution of a menu applet may be associated to a different combination of keys on the keyboard of the mobile telephone (for instance, the following group of digits may be used: *, #, +, 0, 1, 2, 3, 4, 5, 6, 7, 8, 9).

Advantageously, according to the method, an IC Card may support access to an additional service or access to a submenu including entry points to such additional service, directly by a special dialed service number, avoiding browsing the menu on the mobile telephone. When the user dials a telephone number corresponding to a service number, an additional service provided by the IC Card may be immediately executed without any menu navigation or a submenu comprising an application entry to such additional service being displayed. Advantageously, the method does not use software or hardware modification to the mobile telephone, being the triggering of a menu applet treated as an execution of a conventional telephone call.

That which is claimed is:

1. A method for selecting at least one additional service in a mobile telephone comprising a keyboard for dialing a number to set up a telephone communication, the at least one additional service being provided by an Integrated Circuit (IC) Card in the mobile telephone, the method comprising:
comparing a dialed number with at least one service number stored in the IC Card and associated to the at least one additional service;
terminating the set up of the telephone communication; and
triggering the associated additional service corresponding to the dialed number, the at least one additional service displaying a submenu on the mobile telephone, the submenu including a plurality of application entries associated to the at least one additional service.

2. The method according to claim 1 wherein the terminating the set up of the telephone communication and the triggering the associated additional service are executed when the comparing results that the dialed number is equal to the at least one service number.

3. The method according to claim 1 wherein a selection through the keyboard of at least one application entry from the plurality of application entries triggers a corresponding at least one submenu additional service.

4. The method according to claim 1 further comprising initializing, in the IC Card, a value for the at least one service number and associating the at least one service number to the corresponding at least one additional service.

5. The method according to claim 1 wherein the at least one service number comprises numeric digit strings selected from at least one of #, +, *, 0, 1, 2, 3, 4, 5, 6, 7, 8, and 9.

6. The method according to claim 1 wherein the dialing the number to set up the telephone communication comprises a Call Control event originated by the mobile telephone and sent to the IC Card, the Call Control event being compliant to a communication protocol between the mobile telephone and the IC Card.

7. The method according to claim 1 further comprising providing a Sharable Interface for:
registering the at least one additional service, the Sharable Interface being implemented by a respective menu applet providing the at least one additional service; and
launching the triggering of the associated additional service.

8. The method according to claim 7 further comprising:
associating the at least one additional service to corresponding application identification numbers (AIDs); and
grouping the AIDs in an elementary applet identification file inside the IC Card;
the elementary applet identification file being accessed in the triggering to retrieve the at least one additional service.

9. The method according to claim 8 further comprising adding a new additional service to the at least one additional service, the adding comprising:
registering the new additional service to the Shareable Interface; and
inserting a new AID associated with the new application service inside the elementary applet identification file.

10. The method according to claim 8 further comprising removing an additional service by removing the AID corresponding to the removed additional service from the elementary applet identification file.

11. A method for selecting at least one additional service in a mobile telephone comprising a keyboard for dialing a number to set up a telephone communication, the at least one additional service being provided by an Integrated Circuit (IC) Card in the mobile telephone, the method comprising:
comparing a dialed number with at least one service number stored in the IC Card and associated to the at least one additional service;
terminating the set up of the telephone communication;
triggering the associated additional service corresponding to the dialed number; and
displaying a submenu on the mobile telephone associated to the at least one additional service;
the terminating, the triggering, and the displaying being based upon the dialed number being equal to the at least one service number.

12. The method according to claim 11 wherein the dialing the number to set up the telephone communication comprises a Call Control event originated by the mobile telephone and sent to the IC Card, the Call Control event being compliant to a communication protocol between the mobile telephone and the IC Card.

13. The method according to claim 11 further comprising providing a Sharable Interface for:
   registering the at least one additional service, the Sharable Interface being implemented by a respective menu applet providing the at least one additional service; and
   launching the triggering of the associated additional service.

14. An Integrated Circuit (IC) card storing at least one additional service for hosting by a mobile telephone having a keyboard to dial a number for setting up a telephone communication, the IC card comprising:
   a memory for storing and associating at least one service number to the at least one additional service; and
   a processor cooperating with said memory for
      comparing a dialed number with the at least one service number,
      terminating the setting up of the telephone communication,
      triggering the associated additional service corresponding to the dialed number, and
      displaying a submenu on the mobile telephone, the submenu including a plurality of application entries associated to the at least one additional service.

15. The IC card according to claim 14 wherein the terminating and the triggering are activated when said processor determines that the dialed number is equal to the at least one service number.

16. The IC card according to claim 14 wherein a selection through the keyboard of at least one application entry from the plurality of application entries triggers a corresponding at least one submenu additional service.

17. The IC card according to claim 14 wherein said processor initializes a value for the at least one service number and associates the at least one service number to the corresponding at least one additional service.

18. The IC card according to claim 14 wherein the at least one service number comprises numeric digit strings selected from at least one of #, +, *, 0, 1, 2, 3, 4, 5, 6, 7, 8, and 9.

19. A mobile telephone comprising:
   a keyboard for dialing a number to set up a telephone communication;
   a display cooperating with said keyboard to display a menu; and
   an Integrated Circuit (IC) card storing at least one additional service and comprising
      a memory for storing and associating at least one service number to the at least one additional service,
      a processor cooperating with said memory for comparing a dialed number with the at least one service number, for terminating the set up of the telephone communication, for triggering the associated additional service corresponding to the dialed number, and for displaying a submenu on said display, the submenu including a plurality of application entries associated to the at least one additional service.

20. The mobile telephone according to claim 19 wherein the terminating and the triggering are activated when said processor determines that the dialed number is equal to the at least one service number.

21. The mobile telephone according to claim 19 wherein said processor initializes a value for the at least one service number and associates the at least one service number to the corresponding at least one additional service.

* * * * *